United States Patent [19]

Rosaen et al.

[11] 4,167,483
[45] Sep. 11, 1979

[54] FLUID FILTERING DEVICE

[76] Inventors: Borje O. Rosaen, 4031 Thornoaks Dr.; Dale P. Fosdick, 3000 Hunting Valley Dr., both of Ann Arbor, Mich. 48104

[21] Appl. No.: 922,979

[22] Filed: Jul. 10, 1978

[51] Int. Cl.$^2$ .............................................. B01D 27/10
[52] U.S. Cl. .................................. 210/130; 210/168; 210/238; 210/DIG. 14
[58] Field of Search ............... 210/130, 168, 232, 234, 210/238, 416, 450, DIG. 14

[56] References Cited

U.S. PATENT DOCUMENTS

| | | | |
|---|---|---|---|
| 3,487,930 | 1/1970 | Rosaen | 210/130 X |
| 3,628,662 | 12/1971 | Kudlaty | 210/234 X |
| 3,912,633 | 10/1975 | Delaney | 210/238 X |

Primary Examiner—John Adee
Attorney, Agent, or Firm—Gifford, Chandler, VanOphem, Sheridan & Sprinkle

[57] ABSTRACT

A fluid filtering device is provided which is particularly suitable for connection with the return or pressure line of a hydraulic system. The fluid filtering device comprises an elongated tubular cylindrical housing open at each end and which has at least its lower end submerged in a fluid reservoir. An elongated filter assembly includes an extension tube and a tubular cylindrical filter element coaxially connected at one end to the extension tube. The filter assembly is axially insertable into the housing so that the filter element is positioned at least partially below the fluid level of the reservoir. Upon insertion, both axial ends of the filter element sealingly engage the interior walls of the housing while the filter element is spaced radially inwardly from the housing thus forming an annular inlet chamber. Fluid flows from the inlet and into the annular chamber, through the filter element and to the reservoir through the open lower end of the filter element. An elongated tube is disposed within the interior of the filter element and has one end open to the bottom of the extension tube and its other end open adjacent the lower open end of the filter element. Upon removal of the filter assembly, leakage oil contained within the interior of the extension tube is siphoned through the tube and into the fluid reservoir.

8 Claims, 3 Drawing Figures

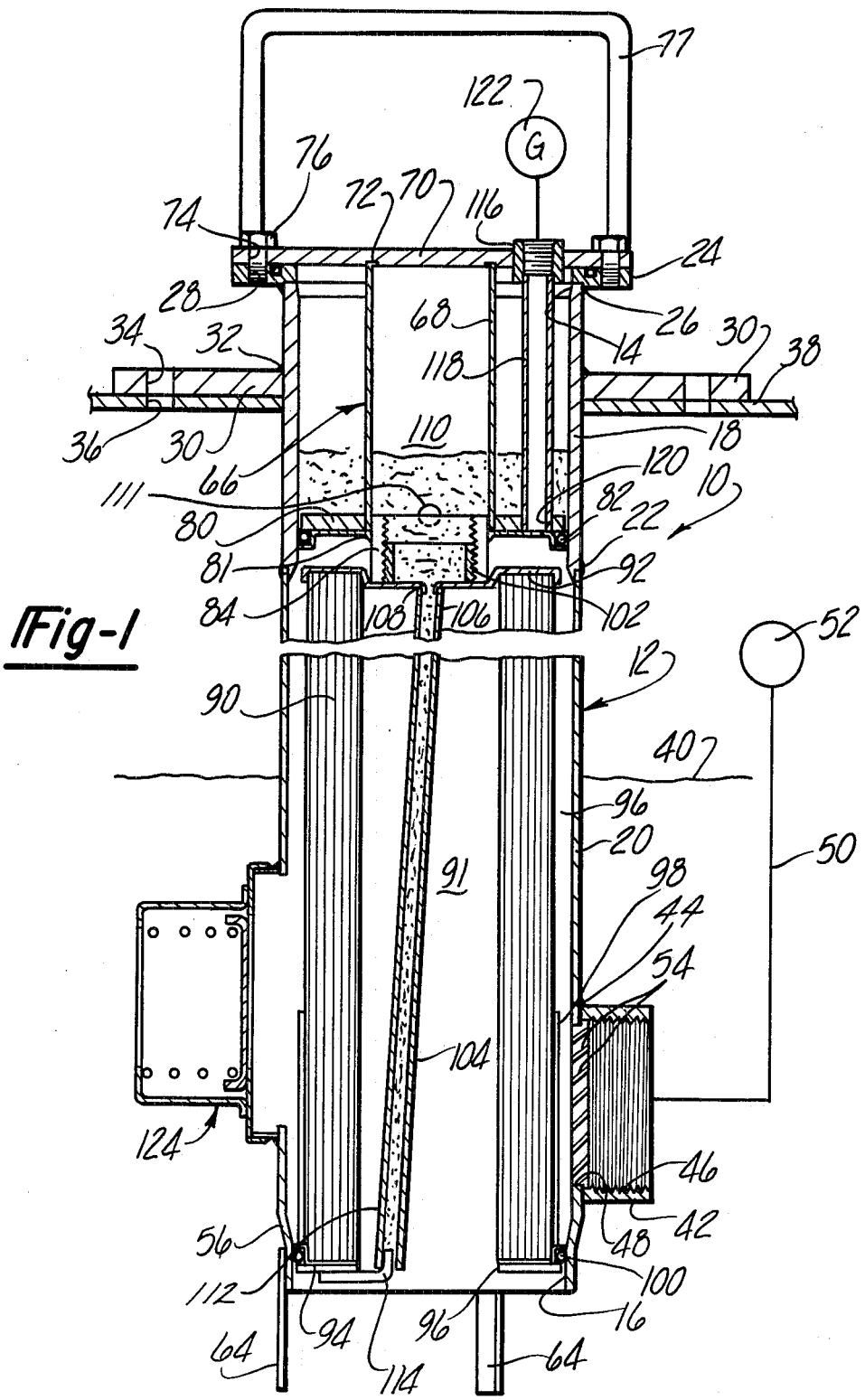

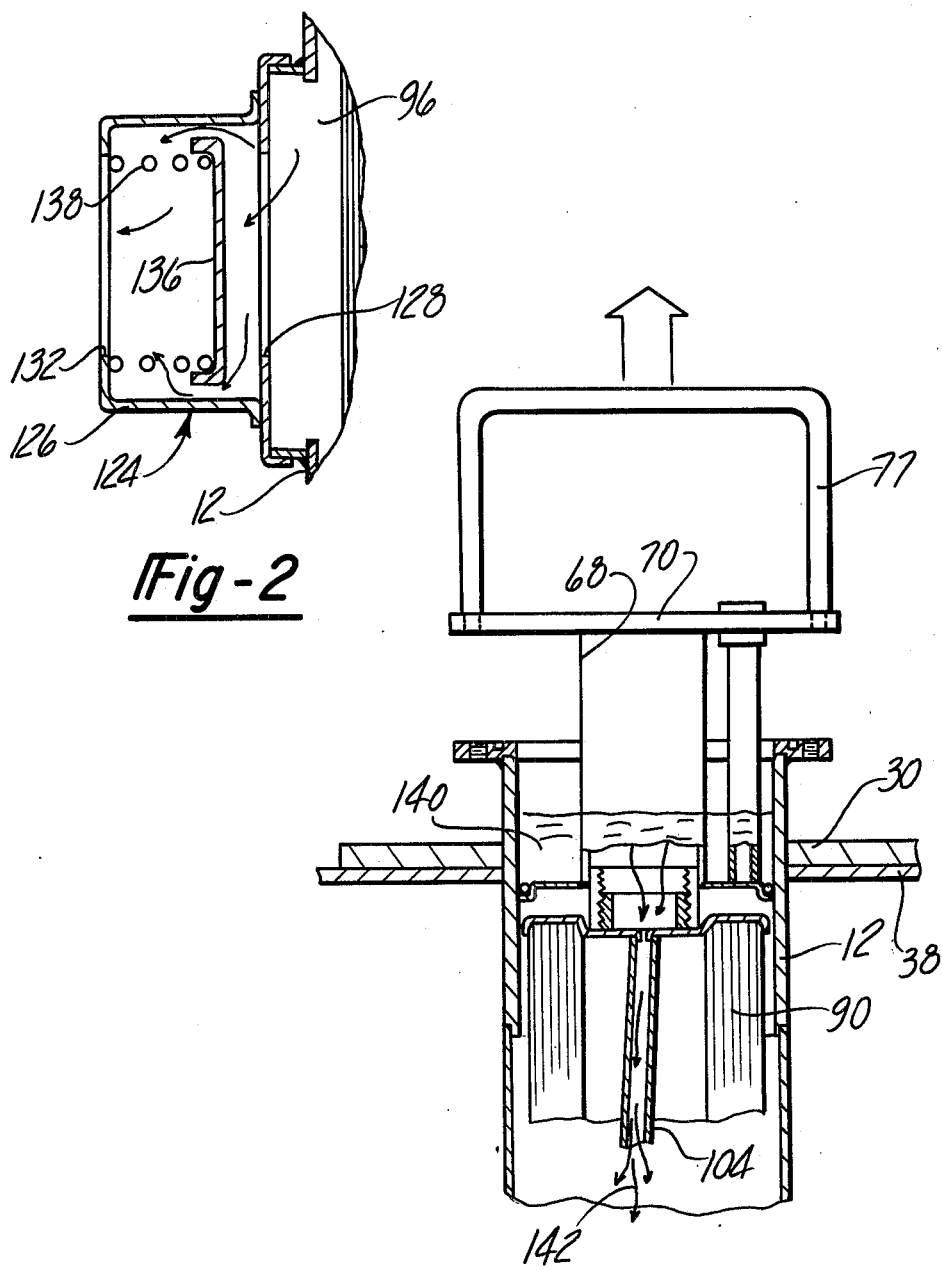

4,167,483

FLUID FILTERING DEVICE

BACKGROUND OF THE INVENTION

I. Field of the Invention

The present invention relates generally to fluid filtering devices and, more particularly, to such a device adapted for connection to the return line of a hydraulic system.

II. Description of the Prior Art

Hydraulic fluid systems conventionally include a reservoir of hydraulic fluid, a suction line for fluidly connecting the reservoir to the hydraulic pump, and a fluid return line from the hydraulic system to the reservoir. The hydraulic fluid within the hydraulic system becomes contaminated during operation of the system and these contaminants must be filtered from the hydraulic fluid in order to prevent damage to the hydraulic pump and other components within the hydraulic system. There have been a number of previously known fluid filtering devices which are fluidly connected to either the suction line from the reservoir or the return line to the reservoir.

There have been a number of previously known return line filters which include a tubular cylindrical housing having one end positioned within the fluid reservoir and into which a filter assembly is slidably received. The filter assembly typically includes an extension tube coaxially secured to a tubular filter element so that upon insertion of the filter assembly into the housing, the filter element is spaced radially inwardly from the interior walls of the housing. In addition, suitable fluids seals are provided at each axial end of the filter element for fluidly sealing the filter element to the housing.

In operation, the return fluid from the hydraulic system first enters the annular chamber between the filter element and the housing, passes through the filter element and finally exits through the lower open end of the filter element and to the fluid reservoir. This type of previously known return line filter is particularly advantageous in that the filter assembly can be removed from the housing without interruption of fluid flow through the hydraulic system return line.

One disadvantage of this type of previously known return line filter is that since the annular or inlet chamber between the filter element in the housing is pressurized, a certain amount of leakage past the fluid seals at both axial ends of the filter element inherently occurs. Fluid leakage past the seals at the lower axial end of the filter element creates no adverse effect since the leakage is merely returned to the fluid reservoir. Conversely, leakage past the seals of the upper end of the filter element accumulates in the interior of the housing above the filter element and within the interior of the extension tube. Thus, when the filter assembly is removed from the housing, this leakage fluid is drawn out with the filter assembly and spills on the workmen and on the floor surrounding the fluid reservoir. Since oil is conventionally used as the hydraulic fluid, the spillage of the oil on the floor creates a serious safety hazard for workmen engaged around the fluid reservoir.

SUMMARY OF THE PRESENT INVENTION

The present invention provides a return line fluid filtering device for a hydraulic system which overcomes the above mentioned disadvantages of the previously known devices.

In brief, the fluid filtering device according to the present invention comprises an elongated cylindrical tubular housing having its lower end inserted into a fluid reservoir. An inlet port is connected to the housing at a position below the fluid level of the reservoir while a filter assembly is axially insertable into the upper open end of the housing.

The filter assembly further includes an extension tube coaxially secured to a tubular filter element which, upon insertion of the filter assembly into the housing, is spaced radially inwardly from the interior walls of the housing thus forming an annular inlet chamber in fluid communication with the inlet port. Fluid seals are provided at both the upper and lower axial ends of the filter element which sealingly engage the interior walls of the housing. Thus, fluid flows into the inlet port and inlet annular chamber, through the filter element and down through the lower open end of the filter element to the fluid reservoir.

A small diameter tube is positioned within the interior of the filter element and is open at one end to the interior of the extension tube near its base. The other end of the tube is open to the fluid reservoir closely adjacent the lower open end of the filter element. Thus, upon removal of the filter assembly from the housing, leakage oil accumulated within the extension tube is siphoned downwardly through the tube and into the fluid reservoir. Appropriate leakage passageways are provided through the extension tube and to the interior of the housing so that fluid leakage into the interior of the housing above the filter element is also evacuated through the tube upon removal of the filter assembly from the housing.

A bypass valve is also secured to the housing and below the fluid level of the reservoir. The inlet of the valve is open to the annular inlet chamber while the valve outlet is open to the fluid reservoir. The bypass valve is spring loaded and opens upon the attainment of a predetermined differential across the filter element, due to clogging, to permit continued operation of the hydraulic system.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIG. 1 is a fragmentary longitudinal sectional view illustrating the fluid filtering device of the present invention;

FIG. 2 is a fragmentary sectional view illustrating the bypass valve of the fluid filtering device of the present invention; and FIG. 3 is a diagrammatic view illustrating the operation of the present invention.

DETAILED DESCRIPTION OF THE PRESENT INVENTION

With reference first to FIG. 1, the fluid filtering device 10 according to the present invention is thereshown and comprises an elongated tubular cylindrical housing 12 which is open at its upper end 14 and at its lower end 16. Preferably the housing 12 is constructed from an upper tubular section 18 coaxially secured to a lower tubular section 20 by welds 22 or the like. The internal diameter of the upper section 18 is somewhat smaller than the lower section 20 for a reason which will be subsequently described.

An annular and radially outwardly extending flange 24 is secured by welds 26 to the upper end of the housing 12. A number of circumferentially spaced threaded bores 28 are axially formed through and around the flange 24.

A still further mounting flange 30 is secured by welds 32 or the like to the outer periphery of the housing 12 at a position spaced axially downwardly from the first flange 24. Axial bores 34 through the second flange 30 register with like bores 36 in a reservoir housing 38 in order to secure the filter device housing 12 to the reservoir housing 38. Suitable fasteners (not shown) secure the second flange 30 to the reservoir housing 38 so that the lower portion of the housing 12 is positioned below the fluid level 40 of the reservoir.

A preferably threaded fluid connector 42 is secured by welds 44 to the housing 12 and below the fluid level 40 so that the fluid connector 42 extends radially outwardly from the housing 12. The interior 46 of the fluid connector 42 fluidly communicates with the interior of the housing 12 through an opening 48 in the housing 12. The fluid connector 42 is connected to the return line 50 of a hydraulic fluid system 52, both of which are illustrated only diagrammatically. In addition, preferably a plurality of baffles or deflectors 54 are provided horizontally across the opening 48 so that fluid flow flowing into the fluid connector from the hydraulic system 52 is deflected downwardly for a reason to be subsequently described.

The lower end of the housing 12 tapers inwardly as shown at 56 thus forming a reduced diameter internal bore for the housing 12 at its lower end A plurality of circumferentially spaced and axially downwardly extending legs 64 are secured to the lower end of the housing 12. The legs 64 insure that the housing 12, is spaced a minimum distance from the bottom of the reservoir so as not to interfere with fluid flow through the open lower end 16 of the housing 12.

Still referring to FIG. 1, a filter assembly 66 is axially insertable into the interior of the housing 12 and is shown in FIG. 1 in its operable or filtering position. The filter assembly 66 includes an elongated extension tube 68 having a circular cap 70 transversely secured across its upper end 72 and which abuts against the housing flange 24 when the filter assembly 66 is in its operable position. Circumferentially spaced bores 74 in the cap 70 register with the flange bores 28 in the flange 24 so that bolts 76 extending through the registering bores 74 and 28 secure the cap 70 to the housing 12. An inverted U-shaped handle 77 is also secured to the cap 70 to facilitate the removal of the filter assembly 66 from the housing 12.

An annular and radially outwardly extending seal carrier 80 is secured to the lower end 81 and outer periphery of the extension tube 68. The seal carrier 80 carries and O-ring type seal 82 about its outer periphery so that the seal 82 sealingly engages the interior walls of the housing 12 upon the insertion of the filter assembly 66 into the housing 12. In addition, an internally threaded pipe section 84 is coaxially secured by welds or the like within the interior of the extension tube 68 at its lowermost end.

The filter assembly 66 further includes a tubular cylindrical filter element 90 entrapped between an upper circular mounting plate 92 and a lower annular rim 94.

The lower rim 94 further defines a central opening 96 open to the lower end 16 of the housing 12 so that fluid within the reservoir 38 freely communicates with the interior chamber 91 of the filter element 90. The filter element 90 is also spaced radially inwardly from the interior walls of the housing 12 thus forming an annular inlet chamber 96 between the filter element 90 and the housing 12 and which is in fluid communication with the inlet fluid connector 42.

A tubular diffuser 98 is secured to the filter element 90 about its outer periphery and near its lowermost end so that fluid flowing into the fluid connector 42 impinges upon the diffuser 98. The function of the diffuser 98 will be subsequently described. In addition, an O-ring seal 100 is carried by the lower filter element rim 94 about its outer periphery. The seal 100 engages the inwardly tapered portion 56 of the housing 12 upon insertion of the filter assembly 66 into the housing 12.

An externally threaded pipe section 102 is coaxially secured to the top of the filter element mounting plate 92. The pipe section 102 threadably engages the pipe section 84 on the extension tube 68 so that the filter element 90 can be selectively screwed onto or off from the extension tube 68 as desired. Consequently, when the filter element 90 becomes clogged with debris, replacement of only the filter element 90, rather than the entire filter assembly 66, is required.

A small diameter tube 104 extends substantially vertically through the interior chamber 91 of the filter element 90. The upper end 106 of the tube 104 is connected to a nipple 108 formed in the filter element mounting plate 92 so that the tube 104 is open to the interior 110 of the extension tube 68 and also to the interior of the housing 12 above the seal carrier 80 via an opening 111 in the extension tube 68. The lower end 112 of the tube 104 is open to the fluid reservoir at a position closely adjacent the lower end of the filter element 90. A pin 114 is secured to the lower filter element mounting rim 94 and extends into the interior of the tube 104 to maintain the tube 104 in position.

Still referring to FIG. 1, in order to monitor the pressure within the annular inlet chamber 96, a nipple 116 is preferably secured to the cap 70 and fluidly connected by a conduit 118 and an opening 120 in the seal carrier 80 to the annular inlet chamber 96. A suitable pressure gage 122 is connected to the nipple 116 and provides an exteriorly visible signal representative of the fluid pressure in the annular inlet chamber 96, and thus, of the degree of clogging of the filter element 90. Since the reservoir fluid is not pressurized, the indicator 122 also provides an indication of the differential pressure across the filter element 90. Since the nipple 116 and conduit 118 are connected to the tubular extension 68, they are reusable despite disposal of the filter element 90.

With reference now to FIGS. 1 and 2, a bypass valve 124 is thereshown and comprises a tubular bypass valve housing 126 secured to an inlet port 128 in the housing 12 so that the bypass valve housing 126 projects radially outwardly from the housing 12. The bypass valve 124 includes an outlet port 132 open to the fluid reservoir.

A circular valve plate 136 is positioned within the valve housing 126. A helical spring 138 abuts against the housing at one end and urges the valve member against the inlet port 128, thus normally closing the valve 124. However, when the pressure within the annular inlet chamber 96 exceeds a predetermined amount, as determined by the spring force of the helical spring 138, the valve plate 136 moves away from the inlet by compressing the spring 138 thus permitting the fluid in the inlet chamber 96 to bypass the filter element 90 and to instead flow around the valve plate 136 and directly into the fluid reservoir.

In operation, the filter assembly 66 is first axially inserted into the interior of the housing 12 until the cap 70 abuts against the upper flange 24. In doing so, the lower O-ring 100 sealingly engages the tapered portion 56 of the housing while the upper O-ring 82 sealingly engages the interior walls of the housing 12 thus sealing both axial ends of the filter element 90 to the housing 12. Since the lower tubular section 20 of the housing 12 is larger in diameter than the upper housing section 18, the filter element 90 with the attached O-ring 100 freely slides through the lower housing section 20 until the O-ring 100 engages the inwardly tapered housing portion 56 to thereby facilitate installation of the filter assembly 66 in the housing 12.

With the filter assembly 66 positioned as thus far described, the pressurized fluid flow from the return line 50 flows into the fluid connector 42 and fills the annular inlet chamber 96 even though a portion of the annular chamber 96 is above the fluid level 40 of the reservoir. Moreover, the deflectors 54 in the opening 48 deflect the incoming fluid flow downwardly against the diffuser 98 while the diffuser 98 prevents an accumulation of debris on the filter element 90 at the area around and adjacent the fluid connector 42.

From the inlet chamber 96 fluid normally flows through the fluid element 90 which removes debris from the fluid, and to the fluid reservoir via the interior chamber 91 of the filter element 90. In the event that the filter element 90 becomes unduly clogged, however, the increase of fluid pressure within the annular chamber 96 will open the bypass valve 124 and permit fluid flow directly to the fluid reservoir thus enabling continued operation of the hydraulic system 52. Moreover, fluid flow through the return line 50 of the hydraulic system 52 is not interrupted upon removal of the filter assembly 66 from the housing 12 even though no filtering of the fluid will occur with the filter assembly 66 removed. Consequently, the filter assembly 66 can be removed from the housing without shutting off the hydraulic power to the system 52.

With reference now to FIGS. 1 and 3, during operation of the fluid filtering device 10, a certain amount of leakage of the fluid inherently occurs around the upper seal 82 so that some fluid 140 will accumulate above the seal carrier 80 and within the interior of the extension tube 68 via the opening 111. Upon removal of the filter assembly 66 from the housing 12, however, the upward movement of the filter assembly 66 causes a suction within the tube 104 which sucks the leakage fluid 140 through the tube 104 and back into the reservoir as depicted by arrows 142 in FIG. 3. In this fashion, by the time the filter assembly 66 is removed from the housing 12, the leakage fluid 140 has been entirely returned to the reservoir thus eliminating the previously known spillage problem of the prior art devices.

The filter element 90 is then unscrewed from the extension tube 68 and replaced by a clean filter element whereafter the filter assembly 66 is reinserted into the housing 12 to continue the filtering operation of the device 10.

Having described my invention, however, many modifications thereto will become apparent to those skilled in the art to which it pertains without deviation from the spirit of the invention as defined by the scope of the appended claims.

I claim:

1. A fluid filtering device for use with a fluid reservoir in which fluid is contained, said filtering device comprising:

an elongated tubular cylindrical housing open at each end and positioned within said reservoir so that one end of said housing is submerged within said fluid while the other open end of said housing is positioned above said fluid, said housing having a fluid inlet formed on one side and below the fluid level in the reservoir and a fluid outlet open to the reservoir;

an elongated filter assembly, said filter assembly comprising an elongated tubular extension and a tubular cylindrical filter element open at one end, means for coaxially connecting one end of the tubular extension to the other end of the filter element, said filter assembly being axially insertable into said housing so that said filter element is positioned at the lower end of said housing and spaced radially inwardly from said housing thereby forming an annular chamber in fluid communication with the housing fluid inlet;

means for fluidly sealing both axial ends of said filter element to said housing;

means for securing the other end of said extension tube to said housing;

means for siphoning fluid from the interior of the housing above said filter element upon the removal of the filter assembly from the housing; and wherein said filter assembly can be removed from said housing without interruption of fluid flow between said fluid inlet and said fluid outlet.

2. The invention as defined in claim 1 wherein said connecting means further comprises a threaded connecting means whereby said filter element can be removed from the tubular extension.

3. The invention as defined in claim 1 wherein said siphoning means further comprises a tube open at one end to the interior of said extension and open at its other end to said reservoir, said extension having an opening in fluid communication with the interior of the housing above the upper filter element sealing means.

4. The invention as defined in claim 1 wherein said tube extends through the interior of the filter element.

5. The invention as defined in claim 4 wherein said end of said tube open to the reservoir is positioned adjacent the lower end of the filter element.

6. The invention as defined in claim 1 wherein said filtering device further includes normally closed fluid bypass valve means which opens at a predetermined differential pressure across the filter element to establish fluid communication from the annular chamber and directly to the reservoir.

7. The invention as defined in claim 1 and further comprising differential pressure indicating means across the filter element, said indicating means further comprising a pressure gage and conduit means for operatively connecting said gage to said annular chamber.

8. The invention as defined in claim 7 wherein said conduit means further comprises a tube connected to said tubular extension and extending axially through a portion of the interior of the housing.

* * * * *

UNITED STATES PATENT AND TRADEMARK OFFICE
CERTIFICATE OF CORRECTION

PATENT NO. : 4,167,483
DATED : September 11, 1979
INVENTOR(S) : Borje O. Rosaen and Dale P. Fosdick It is certified that error appears in the above-identified patent and that said Letters Patent are hereby corrected as shown below:

Column 1, line 34, delete "fluids" and insert --fluid-- therefor;

Column 3, line 35, insert --.-- after "end".

Column 3, line 38, delete ",".

Column 3, line 59, delete "and" and insert --an-- therefor.

Signed and Sealed this

Twentieth Day of November 1979

[SEAL]

Attest:

RUTH C. MASON
Attesting Officer

LUTRELLE F. PARKER
Acting Commissioner of Patents and Trademarks